United States Patent
Moore (10) Patent No.: US 10,247,925 B2
(45) Date of Patent: Apr. 2, 2019

(54) COMPACT IMAGE INTENSIFIER OBJECTIVE WITH GRADIENT INDEX LENSES

(71) Applicant: The United States of America, as represented by the Secretary of the Army, Washington, DC (US)

(72) Inventor: Sean A. Moore, Springfield, VA (US)

(73) Assignee: THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 114 days.

(21) Appl. No.: 15/610,874

(22) Filed: Jun. 1, 2017

(65) Prior Publication Data

US 2018/0348489 A1   Dec. 6, 2018

(51) Int. Cl.
  *G02B 13/16*  (2006.01)
  *G02B 3/00*   (2006.01)
  *G02B 13/00*  (2006.01)

(52) U.S. Cl.
  CPC ........... *G02B 13/16* (2013.01); *G02B 3/0087* (2013.01); *G02B 13/004* (2013.01)

(58) Field of Classification Search
  CPC ........... G02B 3/0087; G02B 9/34–9/58; G02B 13/004; G02B 13/04; G02B 13/16
  USPC .......................... 359/652–655, 715, 771–783
  See application file for complete search history.

(56) References Cited

U.S. PATENT DOCUMENTS

| | | | |
|---|---|---|---|
| 3,873,408 A | 3/1975 | Hensler | |
| 3,904,268 A | 9/1975 | Keck et al. | |
| 4,830,476 A * | 5/1989 | Aoki | G02B 15/161 359/654 |
| 4,859,040 A | 8/1989 | Kitagishi et al. | |
| 4,902,650 A | 2/1990 | Caldwell et al. | |
| 5,184,251 A * | 2/1993 | Tsuchida | G02B 3/0087 359/654 |
| 5,392,431 A * | 2/1995 | Pfisterer | G02B 3/0087 348/E5.138 |
| 5,448,409 A | 9/1995 | Noda | |
| 5,621,574 A * | 4/1997 | Foo | G02B 3/0087 359/653 |
| 5,623,370 A * | 4/1997 | Ueda | G02B 3/0087 359/654 |
| 6,714,354 B2 | 3/2004 | Trotter, Jr. | |
| 7,167,317 B2 | 1/2007 | Jung et al. | |
| 8,837,053 B2 * | 9/2014 | Ishihara | G02B 15/14 359/654 |
| 2013/0003186 A1 | 1/2013 | Beadie et al. | |
| 2015/0307385 A1 | 10/2015 | Klein et al. | |

OTHER PUBLICATIONS

Ohara, "Optical Glass, Technical Information." (Year: 2013).*
Schott, "Optical Glass, Data Sheets." (Year: 2013).*

* cited by examiner

*Primary Examiner* — Nicholas R. Pasko
(74) *Attorney, Agent, or Firm* — Richard J. Kim (57) ABSTRACT

An innovative design for a compact objective lens for use with a digital image intensification camera is described, which uses lenses made with gradient index materials to reduce the number of lens elements required, length and weight over conventional objective lens systems.

12 Claims, 7 Drawing Sheets

Conventional Art

| Surf. # | Surf. Type | Radius | Thickness | Glass | Semi-Aperture |
|---|---|---|---|---|---|
| Object | Sphere | Infinity | Infinity | | |
| 1 | Sphere | 32.48 | 6.22 | 'grin1' | 7.87 |
| 2 | Sphere | 14.54 | 2.55 | | 6.53 |
| Stop | Sphere | Infinity | 1.26 | | 6.45 |
| 4 | Sphere | -81.89 | 3.55 | NSK14 | 6.48 |
| 5 | Sphere | -150.22 | 2.00 | | 6.73 |
| 6 | Sphere | -712.58 | 8.00 | SLAM2 | 7.00 |
| 7 | Sphere | -17.34 | 2.00 | | 7.58 |
| 8 | Sphere | 11.01 | 5.33 | 'grin2' | 7.59 |
| 9 | Sphere | 7.87 | 9.09 | | 6.07 |
| Image | Sphere | Infinity | 0.00 | | 6.69 |

Figure 7

COMPACT IMAGE INTENSIFIER OBJECTIVE WITH GRADIENT INDEX LENSES

GOVERNMENT INTEREST

The invention described herein may be manufactured, used, sold, imported, and/or licensed by or for the Government of the United States of America.

FIELD OF THE INVENTION

This invention relates in general to optics, and more particularly, to objective lenses and gradient index elements.

BACKGROUND OF THE INVENTION

Night vision devices are currently an important asset for the warfighter. Their use has allowed soldiers a tactical advantage in low light level (i.e. nighttime) operations and increased their lethality and survivability on the battlefield.

Technology has allowed for many components of these systems to become smaller and lighter. The advance from analog image intensification tubes to digital focal planes has reduced the weight and length of these systems, and plastic optical materials have allowed for lighter eyepiece optics. Upcoming innovations promise to reduce eyepiece size and weight further.

The objective lens has resisted these trends. Plastics are not available as a material for use by the designers and manufacturers of these systems, as the haze and scatter of these materials precludes their use in front of systems that amplify the incoming light. The military has been looking for a method to reduce the length and weight of these lenses, and therefore on the strain that the soldier experiences with prolonged use of these systems.

A challenge in designing lenses for I2 devices with traditional optics has been the requirement for high performing lenses while maintaining a high numerical aperture, or low f-number, in order to gather enough photons from the object scene to maintain a high signal-to-noise ratio. In this case, the f-number for the objective lens is f/1.3. The difficulty in designing high performance systems with these requirements (large field of view, color correction over a larger waveband, and fast f-number) have led to objective designs with a large number of elements in order to meet performance as measured by spot size or modulation transfer function (MTF), a measure of contrast in the system.

SUMMARY OF THE INVENTION

The present disclosure has resolved these challenges and enables an optical system comprising of an objective which utilizes radial gradient index elements to correct aberrations in the lens performance with fewer optical elements. Specifically, these radial gradient index elements are made using glass that has been doped with an extra substance or a combination of glasses, producing lenses with an index of refraction that varies from a higher index in the center of the lenses, or along their optical axes, to a lower index at their edges.

An exemplary four element (two conventional and two using gradient index materials) is disclosed that is designed for corrected performance over the visible and near-infrared wavelengths that the image intensification (12) system is sensitive. Using these elements allows the designer to maintain performance and field of view using fewer elements, reducing weight and length.

While the exemplary solution may have been developed for the particular case of this system with a particular sensor size with specific field of view and f-number requirements, it should be noted that the technology utilized herein can be applied to numerous objective lens system configurations and requirements.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

An optical system is disclosed comprising an objective lens with two radial gradient index lens elements.

The current disclosure includes the design of an objective lens 100 for use with a digital image intensification system. The lens design requirements compel the lens to have color corrected performance over the wavelength range that the focal plane is sensitive. The exemplary system design provided was designed to maintain corrected performance from 580 nanometers to 900 nanometers. The objective lens focal length of approximately 19 millimeters was selected to provide a 40 degree field of view in the horizontal direction over the focal plane. This parameter would be adjusted dependent on field of view requirements and the focal plane used in the system.

The approach detailed in this disclosure relies on gradient index materials. These elements have a variable index of refraction, varying along the z-axis for axial materials, y-axis for radial, and the x-y-z coordinates for spherical or more amorphous index profiles. These elements can be made using glasses doped with impurities that change the effective index to varying levels across the element, the shaping of several glass types into sheets or nested cylinders and introducing them to a high temperature diffusion process, or a 3D printing process that uses molten glass and can adjust the concentrations of two glasses during the printing process in a manner similar to US Patent Application Publication US 2015/0307385 A1 (Ser. No. 14,697,564) by Klein et al. published on Oct. 29, 2015. In this design, the glass is based on doped titanium silicate glass, which can be manufactured in a manner similar to U.S. Pat. No. 5,448,409 (Noda, 1995)

or U.S. Pat. No. 4,902,650 (Caldwell, et al., 1990). (Said references are incorporated by reference.) The glass and its doping material are mixed while in powder form in concentrations according to the design's index profile and then sintered to create the solid glass lens and polished to produce the final element.

Figure 1:
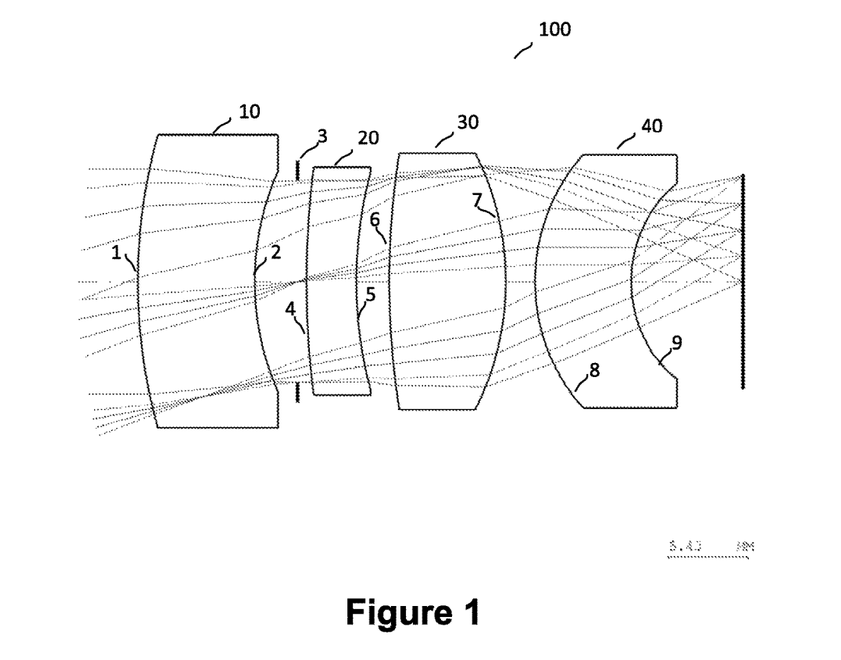
FIG. 1 shows an exemplary optical raytrace of the four element objective for a digital image intensification device.

FIG. 1 shows an exemplary raytrace of the four element objective, for a digital image intensification device. The gradient index elements, otherwise referred to as gradient-index (GRIN) lenses, are the GRIN Lens 10 nearest object space and the GRIN Lens 40 nearest image space. GRIN Lens 10 is an exemplary gradient index element with a radial profile. GRIN Lens 10 is depicted in FIG. 1 as receiving rays from object space on its front aperture, or front optical surface. The front aperture 1 has a diameter of 15.74 mm and a radius of curvature (RoC) of 32.48 mm. Its back aperture 2 has a diameter of 13.06 mm and a RoC of 14.54 mm. The index of refraction for GRIN Lens 10 varies across the element and is highest in the center of the lens, at the optical axis, and becomes lower along the y-axis as the distance from the central axis to the edge of the lens increases. The index profile for GRIN Lens 10 in relation to the distance from the center of the lens for each of three wavelengths is illustrated in FIG. 2.

Figure 2:
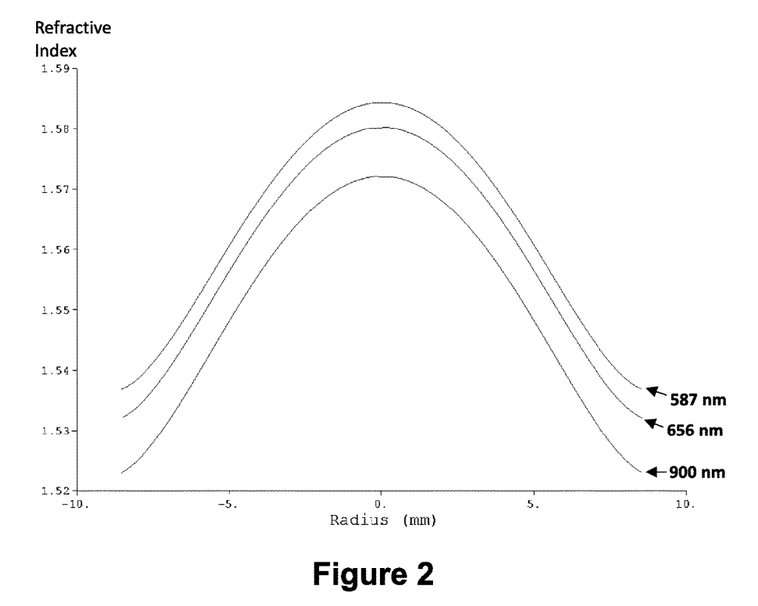
FIG. 2 shows the index profile by wavelength of the lens nearest the object space (GRIN Lens 10) at three wavelengths (587 nm, 656 nm, and 900 nm).

FIG. 2 shows the index profile by wavelength of the lens nearest the object space (GRIN Lens 10) at three wavelengths (587 nm, 656 nm, and 900 nm). The vertical axis represents the index of refraction. The horizontal axis shows the distance from the center of the lens, which is marked with the value zero on this graph. FIG. 2 illustrates the change in index of the elements in relation to wavelength, and show that if the index delta is produced by using two (or more) glasses, these glasses should be well matched in their dispersive properties.

An internal aperture stop 3 is located between the back aperture 2 of GRIN Lens 10 and the front aperture 4 of Lens 20. The aperture has a diameter of 12.90 mm.

Lens 20 is configured as an exemplary meniscus lens with its front aperture 4 facing the back aperture 2 of GRIN Lens 10. The front aperture 4 of Lens 20 can have an aperture diameter of 12.96 mm and a ROC of −81.89 mm, its back aperture 5 having an aperture diameter of 13.46 mm and ROC of −150.22 mm. Further, the material composition of Lens 20 can be based on NSK-14. Lens 30 is configured as an exemplary double convex lens with its front aperture 6 facing the back aperture 5 of Lens 20. The front aperture 6 of Lens 30 can have an aperture diameter of 14.00 mm and Radius of Curvature (ROC) of −712.58 mm, its back aperture 7 having an aperture diameter of 15.16 mm and ROC of −17.34 mm. Further, the material composition of Lens 30 can be based on SLAM-2.

GRIN Lens 40 is an exemplary gradient index element with a radial profile. GRIN Lens 40 is depicted in FIG. 1 as having its front aperture 8 facing the back aperture 7 of Lens 30. The front aperture 8 has a diameter of 15.18 mm and a RoC of 11.01 mm. Its back aperture 9 has a diameter of 12.14 mm and a RoC of 7.87 mm. The index of refraction for GRIN Lens 40 varies across the element and is highest in the center of the lens, at the optical axis, and becomes lower along the y-axis as the distance from the central axis to the edge of the lens increases. The index profile for GRIN Lens 40 in relation to the distance from the center of the lens for each of three wavelengths is illustrated in FIG. 3.

Figure 3:
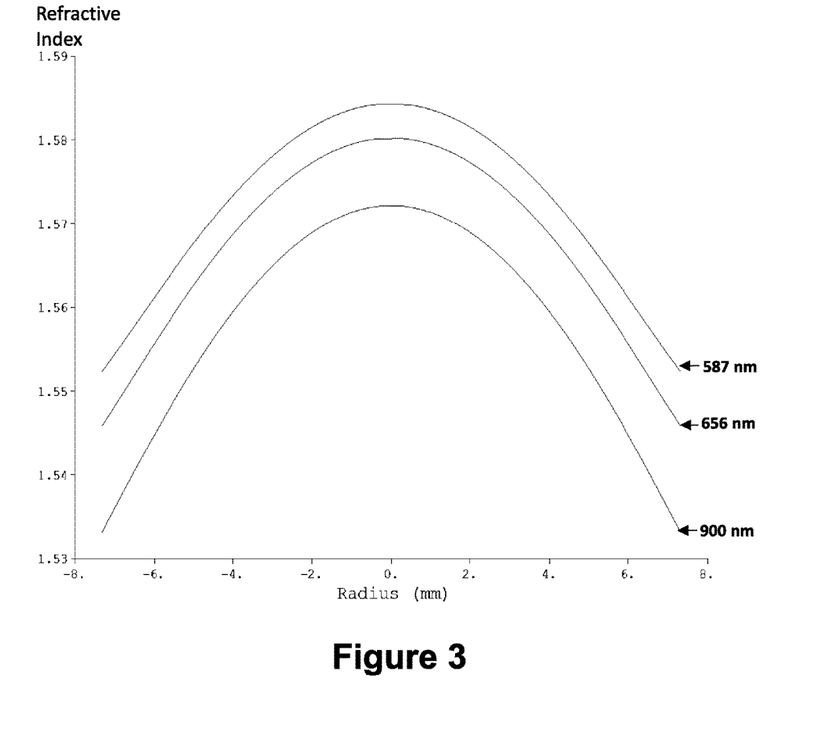
FIG. 3 shows the index profile by wavelength of the lens nearest the image space (GRIN Lens 40) at three wavelengths (587 nm, 656 nm, and 900 nm).

FIG. 3 shows the index profile by wavelength of the lens nearest the image space (GRIN Lens 40) at three wavelengths (587 nm, 656 nm, and 900 nm). The vertical axis represents the index of refraction. The horizontal axis shows the distance from the center of the lens, which is marked with the value zero on this graph. FIG. 3 illustrates the change in index of the elements in relation to wavelength, and show that if the index delta is produced by using two (or more) glasses, these glasses should be well matched in their dispersive properties.

Figure 7:
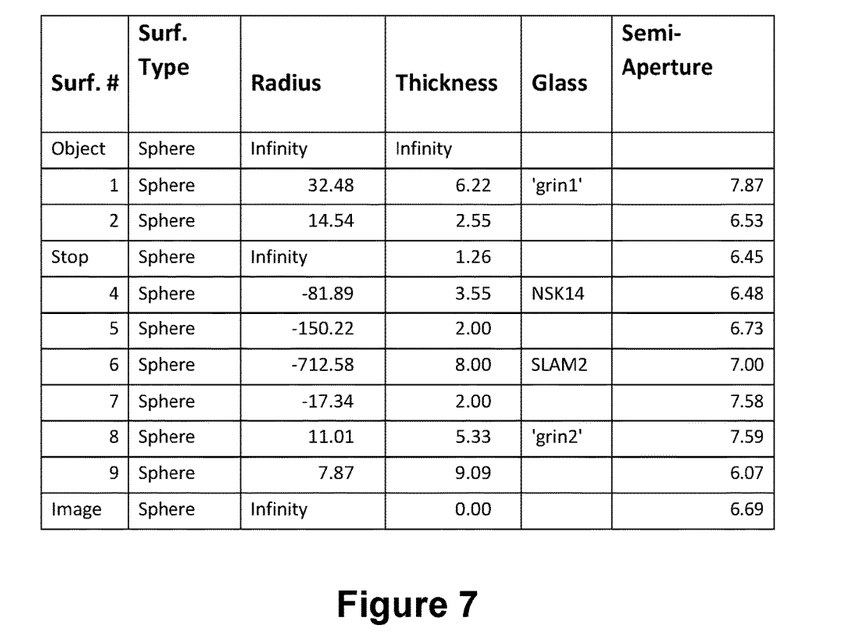
FIG. 7 tabulates the lens data for the exemplary design with gradient index elements.

FIG. 7 provides a table listing the aforementioned data for the lens elements for the exemplary objective design revealed in this disclosure. Specifically, FIG. 7 tabulates the lens data for the exemplary design with gradient index elements. Listed are characteristics including the lenses' radii of curvature, thickness, glass, semi-aperture and others used by optical design software packages.

Figure 4:
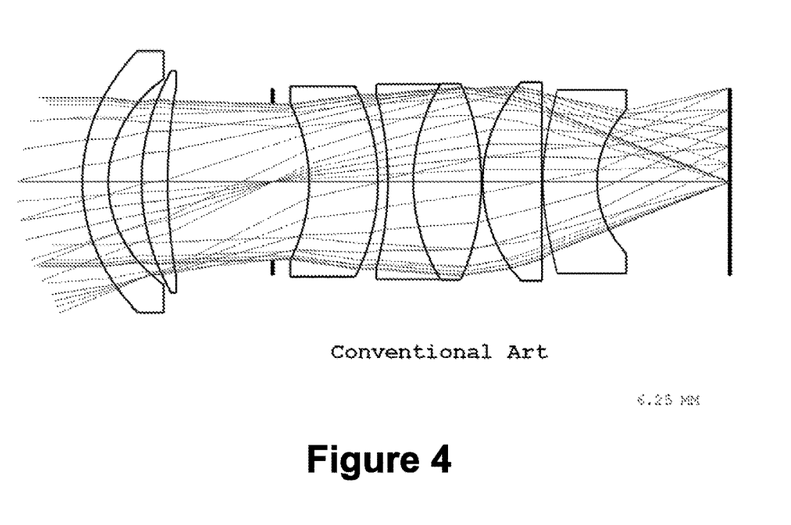
FIG. 4 shows an exemplary optical raytrace of a conventional optical objective lens that meets the same requirements as the disclosed optical design.

The exemplary conventional objective design used as a comparison for this system had 7 lens elements with a length of 55 millimeters. It is illustrated in FIG. 4. The objective disclosed herein utilizing gradient index elements has 4 elements and a length of 30.9 millimeters. The weight of the lens system would also change proportionally. The gradient index elements have the capability to replace a number of conventional elements, as the change in power across the aperture resulting from the change in index can act as an aspheric surface, even though the surfaces all remain spherical. This allows the design software to find solutions that can correct for off-axis aberrations across the field of view, while also correcting the aberrations that are introduced when using larger apertures to gather more light. The modulation transfer functions for the gradient index design [FIG. 5] and the conventional design [FIG. 6] across the field of view are included for comparison.

Figure 5:
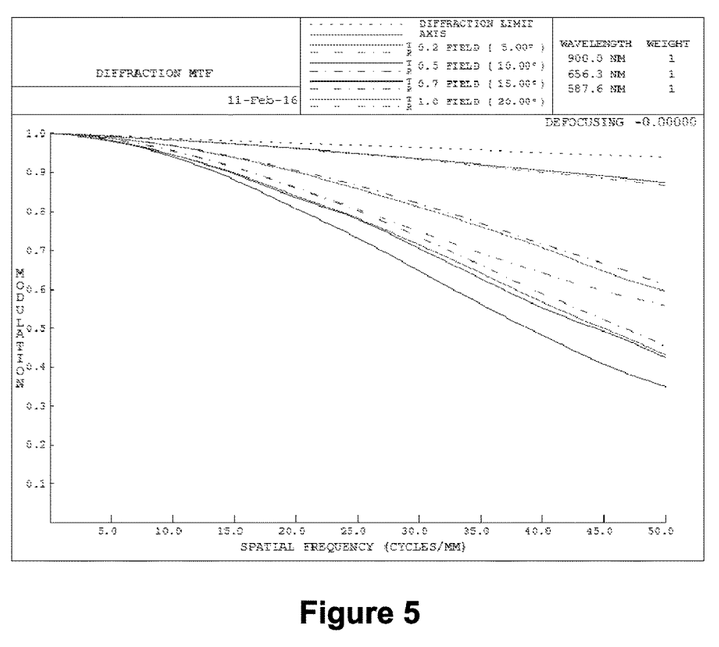
FIG. 5 shows the modulation transfer function for the exemplary optical design using two gradient index elements.
Figure 6:
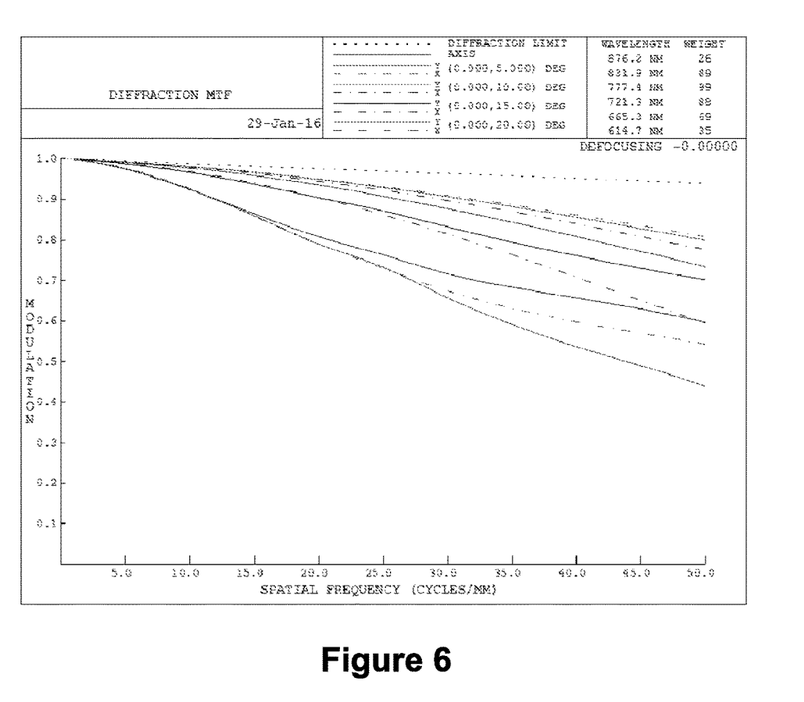
FIG. 6 shows the modulation transfer function for the equivalent exemplary conventional design.

Specifically, FIG. 5 shows the modulation transfer function for the exemplary optical design using two gradient index elements (GRIN Lens 10 and 40); whereas FIG. 6 shows the modulation transfer function for the equivalent exemplary conventional design for comparison. Both graphs include the values for object angles 0°, 5°, 10°, 15°, and 20° out to a spatial frequency of 50 lp/mm.

It is obvious that many modifications and variations of the present invention are possible in light of the above teachings. It is therefore to be understood that within the scope of the appended claims, the invention may be practiced otherwise than as described.

What is claimed is:

1. A compact image intensifier objective based on gradient index lenses for a digital image intensification device, comprising:
   a first GRIN lens having its front surface disposed nearest an object space, wherein the front surface of said first GRIN lens has a diameter of 15.74 mm and a radius of curvature of 32.48 mm;
   a meniscus lens with its front surface facing a back surface of said first GRIN Lens;
   a double convex lens with its front surface facing a back surface of said meniscus lens; and
   a second GRIN lens having its back surface disposed nearest an image space such that an image from said object space passing through said first GRIN lens, said meniscus lens, said double convex lens, and said second GRIN lens is focused onto an image plane of said image space.

2. The compact image intensifier objective recited in claim 1, wherein said first GRIN lens is a gradient index element with a radial profile.

3. The compact image intensifier objective recited in claim 1, wherein the back surface of said first GRIN lens has a diameter of 13.06 mm and a radius of curvature of 14.54 mm.

4. The compact image intensifier objective recited in claim 1, wherein said first GRIN lens is a gradient index element having an index of refraction that varies across the gradient index element, the index of refraction being highest at a center optical axis of said first GRIN lens.

5. The compact image intensifier objective recited in claim 1, wherein an internal aperture stop is disposed between the back surface of said first GRIN lens and the front surface of said meniscus lens.

6. The compact image intensifier objective recited in claim 1, wherein the front surface of said meniscus lens has a diameter of 12.96 mm and a radius of curvature of −81.89 mm, the back surface having a diameter of 13.46 mm and a radius of curvature of −150.22 mm.

7. The compact image intensifier objective recited in claim 1, wherein the front surface of said double convex lens has a diameter of 14.00 mm and a radius of curvature of −712.58 mm, the back surface having a diameter of 15.16 mm and a radius of curvature of −17.34 mm.

8. The compact image intensifier objective recited in claim 1, wherein said second GRIN lens is a gradient index element with a radial profile.

9. A compact image intensifier objective based on gradient index lenses for a digital image intensification device, comprising:
- a first GRIN lens having its front surface disposed nearest an object space;
- a meniscus lens with its front surface facing a back surface of said first GRIN Lens;
- a double convex lens with its front surface facing a back surface of said meniscus lens; and
- a second GRIN lens having its back surface disposed nearest an image space such that an image from said object space passing through said first GRIN lens, said meniscus lens, said double convex lens, and said second GRIN lens is focused onto an image plane of said image space, wherein the front surface of said second GRIN lens has a diameter of 15.18 mm and a radius of curvature of 11.01 mm.

10. The compact image intensifier objective recited in claim 1, wherein said first and second GRIN lenses are gradient index elements, each having a respective index of refraction that varies across the gradient index element and in relation to wavelength.

11. A compact image intensifier objective based on gradient index lenses for a digital image intensification device, comprising:
- a first GRIN lens having its front surface disposed nearest an object space;
- a meniscus lens with its front surface facing a back surface of said first GRIN Lens;
- a double convex lens with its front surface facing a back surface of said meniscus lens; and
- a second GRIN lens having its back surface disposed nearest an image space such that an image from said object space passing through said first GRIN lens, said meniscus lens, said double convex lens, and said second GRIN lens is focused onto an image plane of said image space, wherein the back surface of said second GRIN lens has a diameter of 12.14 mm and a radius of curvature of 7.87 mm.

12. The compact image intensifier objective recited in claim 1, wherein said second GRIN lens is a gradient index element having an index of refraction that varies across the gradient index element, the index of refraction being highest at a center optical axis of said second GRIN lens.

* * * * *